(12) United States Patent  (10) Patent No.: US 7,590,679 B2
McCarty et al.  (45) Date of Patent: Sep. 15, 2009

(54) MANAGING MULTIPLE UNIT ATTENTIONS

(75) Inventors: James Francis McCarty, Colorado Springs, CO (US); Michael Dean Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 695 days.

(21) Appl. No.: 10/967,585

(22) Filed: Oct. 18, 2004

(65) Prior Publication Data

US 2006/0085539 A1 Apr. 20, 2006

(51) Int. Cl.
*G06F 15/173* (2006.01)
(52) U.S. Cl. ........................ 709/201; 709/224
(58) Field of Classification Search ................. 709/224, 709/201; 711/156
See application file for complete search history.

(56) References Cited

U.S. PATENT DOCUMENTS

| 6,138,161 | A | 10/2000 | Reynolds et al. |
| 6,205,141 | B1 | 3/2001 | Arroyo |
| 6,341,315 | B1 | 1/2002 | Arroyo et al. |
| 6,718,402 | B1 | 4/2004 | Arroyo |
| 7,127,572 | B2 * | 10/2006 | Tyndall et al. ............... 711/156 |

* cited by examiner

*Primary Examiner*—Krisna Lim
(74) *Attorney, Agent, or Firm*—Fellers, Snider, et al.

(57) ABSTRACT

A format is provided for a command signal from a target device comprising a bit field adapted for communicating a unit attention signal from the target device following a status changing event. A method is provided for managing a unit attention signal from a target device in a distributed network, comprising: setting an indicator bit in a bit field of a command signal from the target device to a signaling value when a predetermined condition warrants an associated unit attention signal; detecting the indicator bit; and indexing a table in relation to the indicator bit to send the unit attention signal.

18 Claims, 5 Drawing Sheets

MANAGING MULTIPLE UNIT ATTENTIONS

FIELD OF THE INVENTION

The present invention relates generally to data storage systems and more particularly, but without limitation, to managing multiple unit attentions in a computer network.

BACKGROUND

In a distributed computer network, such as a fibre channel-to-SCSI router architecture, one interface, such as a SCSI router, can communicate with a plurality of target devices on behalf of a plurality of initiators, such as host devices, attached to the fibre channel. In this arrangement the router provides a pass-through data management role. That is, the target device is transparent to the initiator sending a command, and likewise the host is transparent to the target sending a signal.

In this pass-through management role, one thing the router does is receive unit attention signals from the target device and send them to all the initiators in the network. A unit attention signal communicates information about the current status of the target. Generally, the target sends a unit attention signal after going through some change in status of which the initiator will benefit in knowing as part of its operational sequencing. For example, a unit attention signal might be sent if the target has undergone a power-on sequence, or if a reserve relationship has been interrupted, or if a code change has occurred affecting the initiator-target relationship or status.

Where there are multiple initiators in the network, it is important that the unit attention signal be communicated to each and every initiator. However, only one unit attention signal can be processed for each command from the target to the initiator in a SCSI network. Accordingly, some attempted solutions employ using registers and associated code to record the event of a target having a pending unit attention signal, as well as other registers to record which of the plurality of initiators have received the pending unit attention signal. Such solutions involve complex programming steps that are cumbersome to modify, such as when it is desireable to change or add to the conditions that warrant the unit attention signal be sent. Also, such solutions are not readily adaptable to storing and subsequently sending multiple prioritized unit attention signals.

SUMMARY OF THE INVENTION

As embodied herein and as claimed below, the present invention is generally directed to a device and associated method for managing unit attention signals in a distributed computer network.

In some embodiments a format is provided for a command signal from a target device comprising a bit field adapted for communicating a unit attention signal from the target device following a status changing event.

In some embodiments a method is provided for managing a unit attention signal from a target device in a distributed network, comprising: setting an indicator bit in a bit field of a command signal from the target device to a signaling value when a predetermined condition warrants an associated unit attention signal; detecting the indicator bit; and indexing a table in relation to the indicator bit to send the unit attention signal.

In some embodiments a system is provided for processing a unit attention signal from a target device in a distributed network, comprising a command signal from the target device, and means for managing two or more unit attention signals embedded within the command signal.

These and various other features and advantages which characterize the embodiments of the claimed invention will become apparent upon reading the following detailed description and upon reviewing the associated drawings.

DETAILED DESCRIPTION

Figure 1:
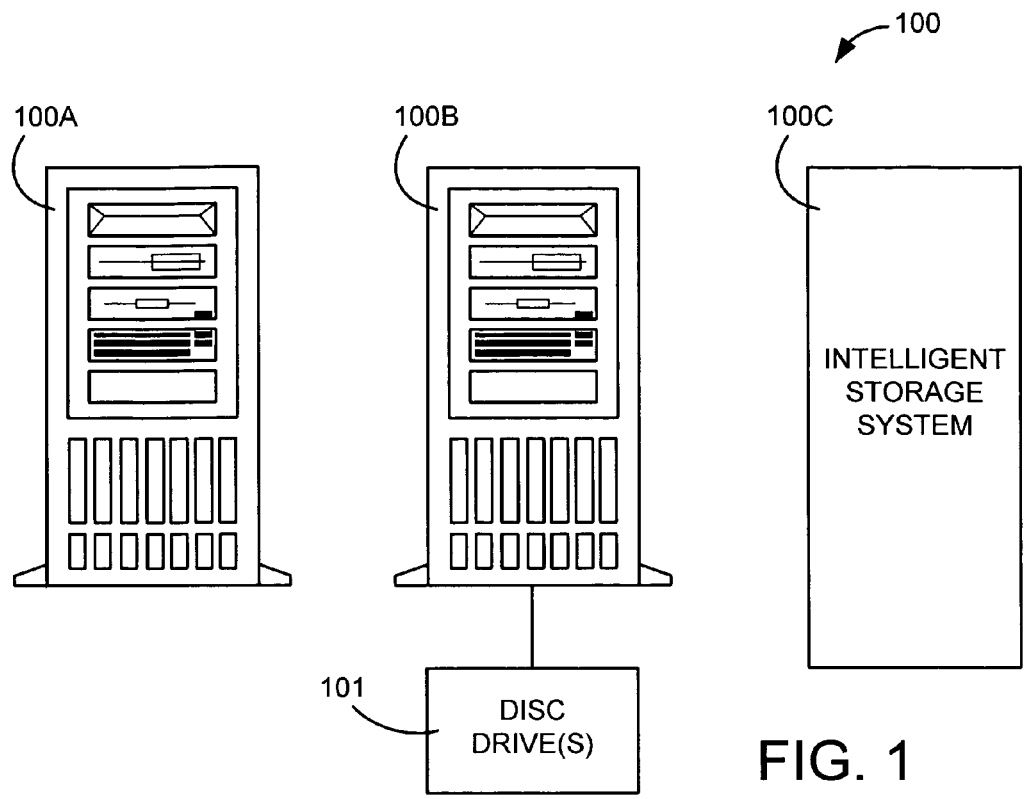
FIG. 1 is a diagrammatical depiction of exemplary operating systems in which various embodiments of the present invention can be employed.

FIG. 1 depicts exemplary operating systems in which embodiments of the present invention can be employed, such as in a computer 100A, or in a server 100B with internal or attached data storage devices 101, or in an intelligent storage system 100C. Intelligent storage system 100C is representative of storage systems that can have intelligent controllers and interfaces and that can have one or more data storage arrays.

Operating systems 100 each contain at least one CPU, a plurality of data storage devices 101 defining a data storage capacity, and metadata describing the configuration of the data storage capacity. By "configuration" it is meant that a description is provided to the system 100 regarding whether particular portions of the storage capacity are being used to store data, or "allocated" space, as opposed to the portions that are available for storing data, or "allocatable" space.

Other operating systems suited for use with various embodiments of the present invention include additional data storage devices 101, additional data storage arrays, additional data storage device controllers or network interface controllers, and the like, that are not depicted in FIG. 1. For example, embodiments of the present invention can be used in a system 100 that includes at least two data storage devices 101 and one controller. Embodiments of the present invention can be employed in simple systems having little or no fault tolerance redundancy to highly redundant systems having no single point of failure.

Figure 2:
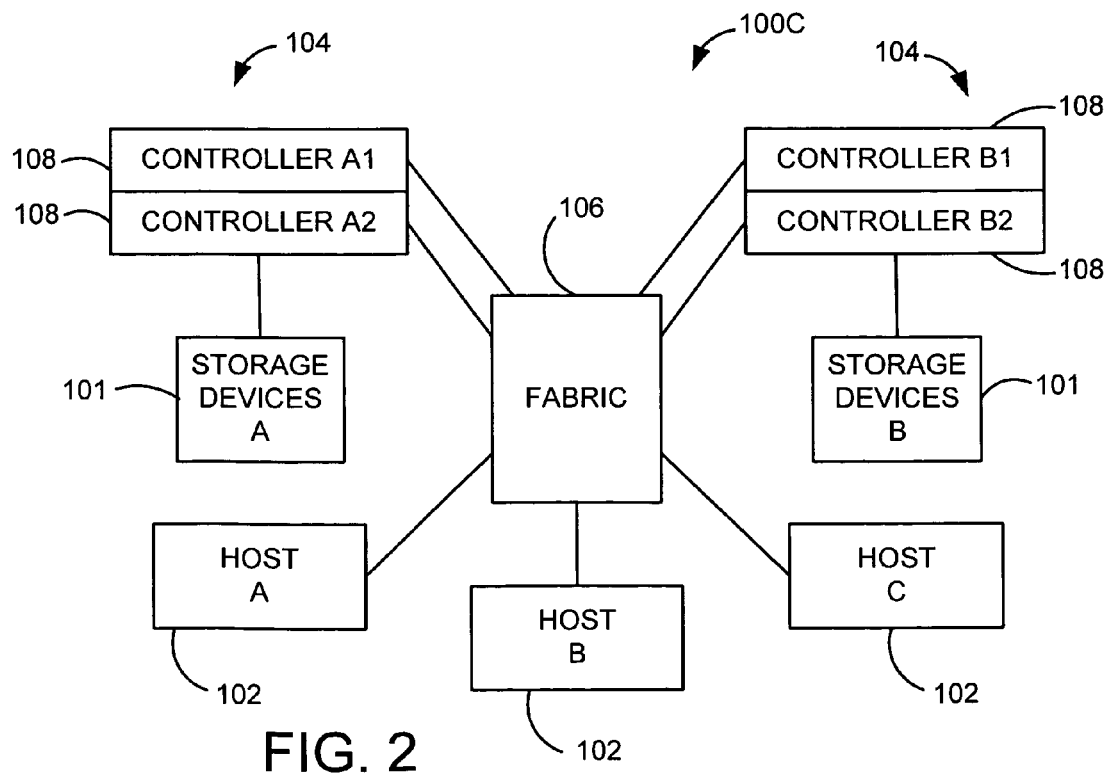
FIG. 2 is a top level functional block depiction of a computer-based system characterized as a wide-area network utilizing mass storage.

To illustrate an exemplary environment in which presently preferred embodiments of the present invention can be advantageously practiced, FIG. 2 shows a computer-based system 100C which is a distributed network characterized as a wide area network (WAN) utilizing mass storage.

The system 100C includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well, including the Internet.

Each array 104 includes a pair of controllers 108 (denoted A1, A2 and B1, B2) and a set of data storage devices 101, preferably characterized as disc drives operated as a RAID. The controllers 108 and data storage devices 101 preferably utilize a fault tolerant arrangement so that the various controllers 108 utilize parallel, redundant links and at least some of the user data stored by the system 100C is stored in a redundant format within at least one set of the data storage devices 101.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 3:
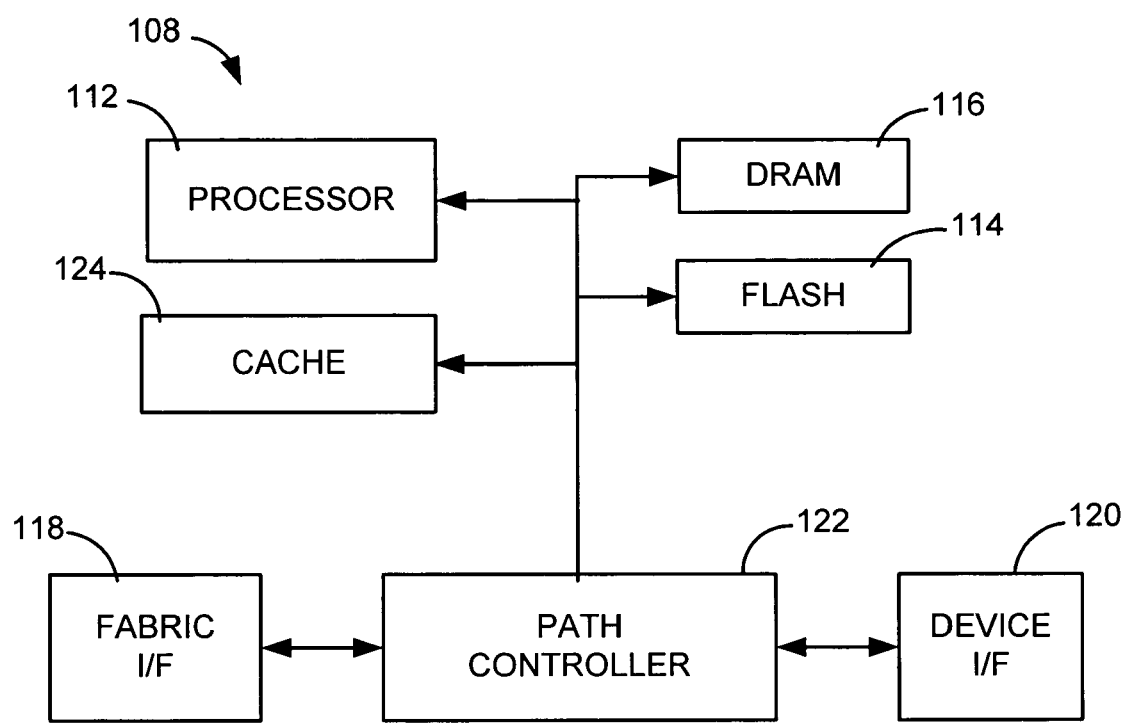
FIG. 3 provides a functional block diagram illustrating a selected one of the controllers of FIG. 2.

FIG. 3 illustrates a selected one of the controllers 108 in greater detail. The controller 108 can be embodied in a single integrated circuit, or distributed among a number of discrete circuits as desired. A main processor 112, preferably characterized as a programmable, computer processor, provides control in accordance with programming steps and processing data preferably stored in non-volatile memory 114 (such as flash memory or similar) and in dynamic random access memory (DRAM) 116.

A fabric interface (I/F) circuit 118 communicates with the other controllers 108 and the host computers 102 via the fabric 106, and a device I/F circuit 120 communicates with the storage devices 101. The I/F circuits 118, 120 and a path controller 122 form a communication path to pass commands and data between the storage array 104 and the host 102, such as by employing the cache memory 124. Although illustrated discretely, it will be understood that the path controller 122 and the I/F circuits 118, 120 can be unitarily constructed. For illustrative purposes of this description and the appended claims, the fabric interface 118 can be characterized as a SCSI router device.

The data storage capacity of an array 104, defined by the extent of the data storage devices 101 in a given array 104, is organized into logical units (LUNs) that can be written to and read from the array 104. System configuration information defines the relationship between user data files, including any associated parity and mirror data, with the respective storage locations. The system configuration information furthermore identifies the relationship between blocks of storage capacity allocated to user files and the memory storage locations, such as logical block addresses (LBA). The system configuration information can furthermore include virtualization by defining virtual block addresses that are mapped to LBAs.

System configuration information is changed in response to a configuration change request from the system 100C. In response, storage capacity can be allocated, such as when saving new files or enlarging existing files, or storage capacity can be deallocated, such as when deleting files or reducing the size of existing files. For purposes of this description and the appended claims, the term "allocation" means either an allocation or deallocation of storage capacity. System metadata is resultant data defining file allocation information states and other data structures that support allocation processes.

Figure 4:
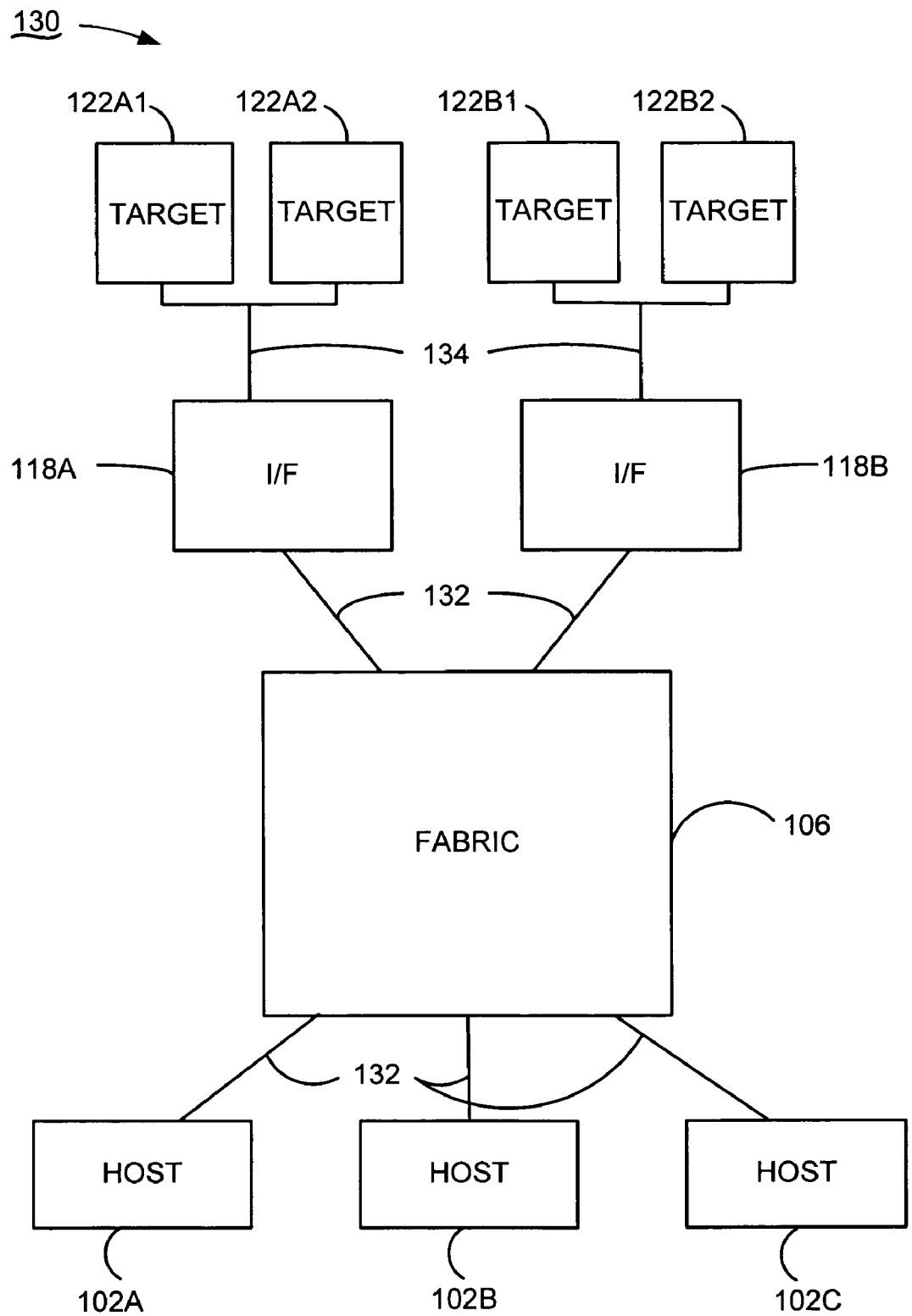
FIG. 4 is provides a functional block diagram of multiple hosts linked to multiple targets in a fibre channel-to-SCSI network.

FIG. 4 illustrates a distributed network 130 characterized as a fibre channel-to-SCSI network that is well suited for employing embodiments of the present invention in managing multiple unit attention signals from a plurality of targets to a plurality of initiators in the network. The fibre channel network 106 links each of the hosts 102A, 102B, 102C to each of the interfaces 118A, 118B by way of network links 132, which can be any type of fibre-channel network connection. The targets (path controllers) 122A1, 122A2 are linked to the interface (router) 118A and the targets 122B1, 122B2 are linked to the interface 118B by way of SCSI network link 134 for communicating the target command signal 140, which can be any type of SCSI network connection.

The embodiments of FIG. 4 are illustrative and not limiting as to the number of hosts 102 and targets 122 contemplated. Because the host 102 is transparent to the target 122, for purposes of the description and appended claims the term "initiator" can mean either the host 102 or the interface 118.

Figure 5:
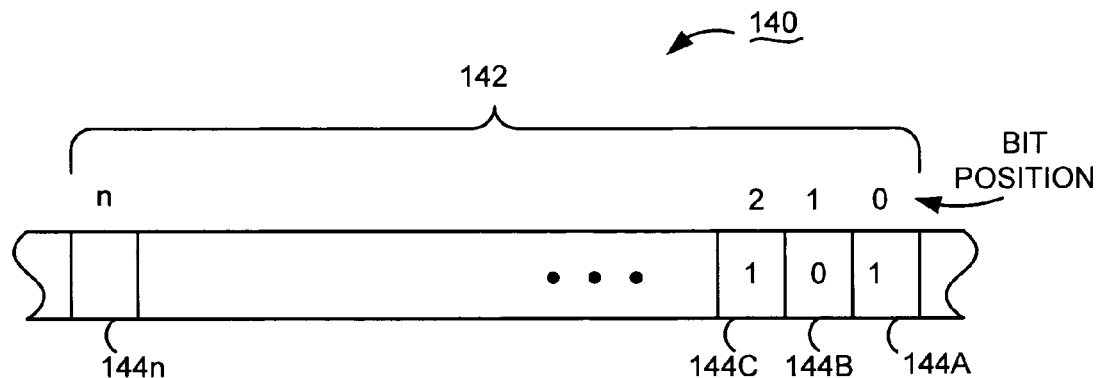
FIG. 5 is a diagrammatical representation of a portion of the target command signal.

During normal operations, each of the hosts 102 send commands to the targets 122 which, in turn, execute the commands if possible and then return SCSI command signals, such as a command complete signal. The embodiments of the present invention contemplate a format for the target command signal 140. Generally, as illustrated in FIG. 5, the target command signal 140 (only a portion shown) format comprises a bit field 142 embedded therein that is adapted for communicating that a unit attention signal is appropriate according to the current status of the target 122. That is, the particular target 122 has undergone a status changing event since the previous communication with the host 102 issuing a command. When the status warrants the target 122 sending a particular unit attention signal, it does so by setting a corresponding indicator bit 144 of the bit field 142 to a signaling value.

Preferably, the bit field 142 comprises two or more indicator bits, such as indicator bits 144A, 144B, 144C, . . . 144n as illustrated in FIG. 5. This permits the target command signal 140 to have multiple unit attention signals embedded therein, although only one unit attention signal can be processed for every target command signal 140. To prioritize the processing of multiple unit attention signals, however, the indicator bits 144 can be prioritized with respect to the bit position within the bit field 142. For example, in FIG. 5 the indicator bit 144A in the "0" bit position can be associated with the highest priority unit attention signal, such as a "power-on status report" sent by the target 122. The other indicator bits 144 can be positioned thereafter in order of decreasing priority. For example, the indicator bit 144B can be associated with a unit attention signal of a "mode changed status report," which is of relatively lower priority than the power-on status report. By prioritizing the unit attention signals in relation to the indicator bit 144 position within the bit field 142, the highest priority pending unit attention signal can be easily determined and communicated.

Figure 6:
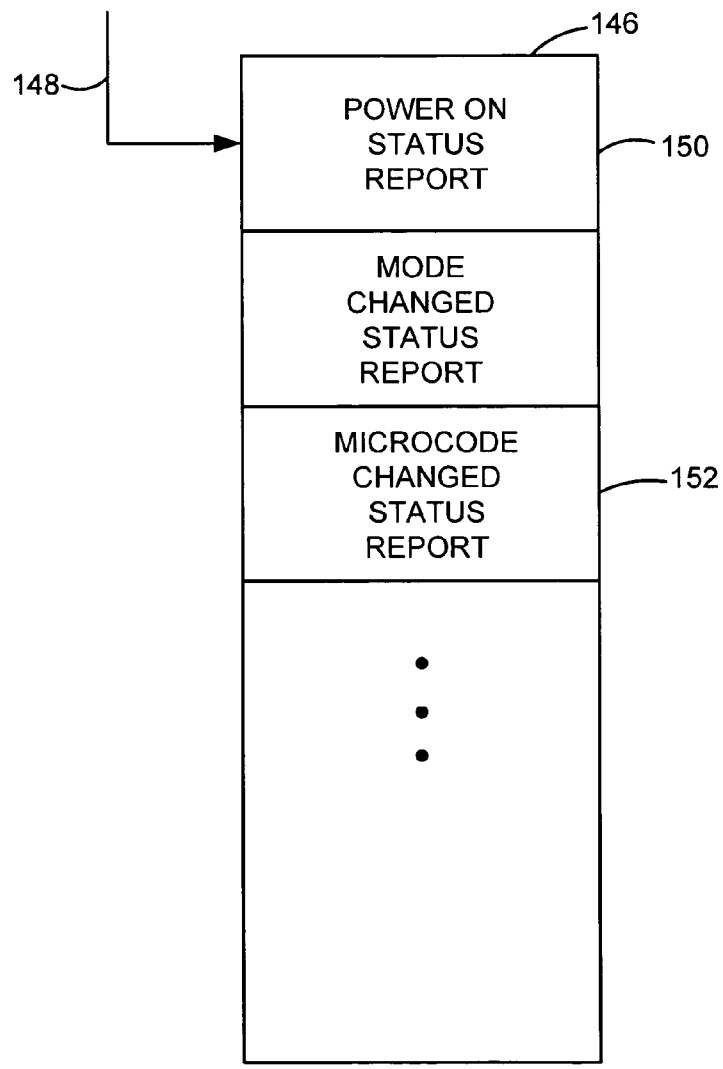
FIG. 6 is a diagrammatical representation of an indexable table containing a plurality of unit attention sequences.

The indicator bits 144 can be detected by the interface 118 during otherwise normal processing of the target command signal 140. The presence of an indicator bit 144 with a signaling value, or the highest-priority indicator bit 144 where two or more have signaling values, can by bit position be used to index a table 146 as shown in FIG. 6 that executes code associated with the respective unit attention sequences. For example, FIG. 5 illustrates indicator bits 144A, 144B have assumed the signaling value as indicated by the value "1" in the "0" and "2" bit positions. This means the target 122 currently has two pending unit attention signals. The highest-priority indicator bit 144A can index a pointer 148 of the table 146 to the corresponding address 150 to execute code for the respective unit attention sequence. After executing the code, in this case the "power on status report," the target 122 resets the previously controlling indicator bit 144 to a default value (such as a "0" value). In the illustrative case of FIG. 5, then on the next target command signal 140 the next-highest-priority indicator bit 144C, having assumed the signaling value, is used to again index the table 146 and thereby access the corresponding address 152 to execute the code associated with that unit attention sequence, such as the "micro code changed status report" as illustrated.

Figure 7:
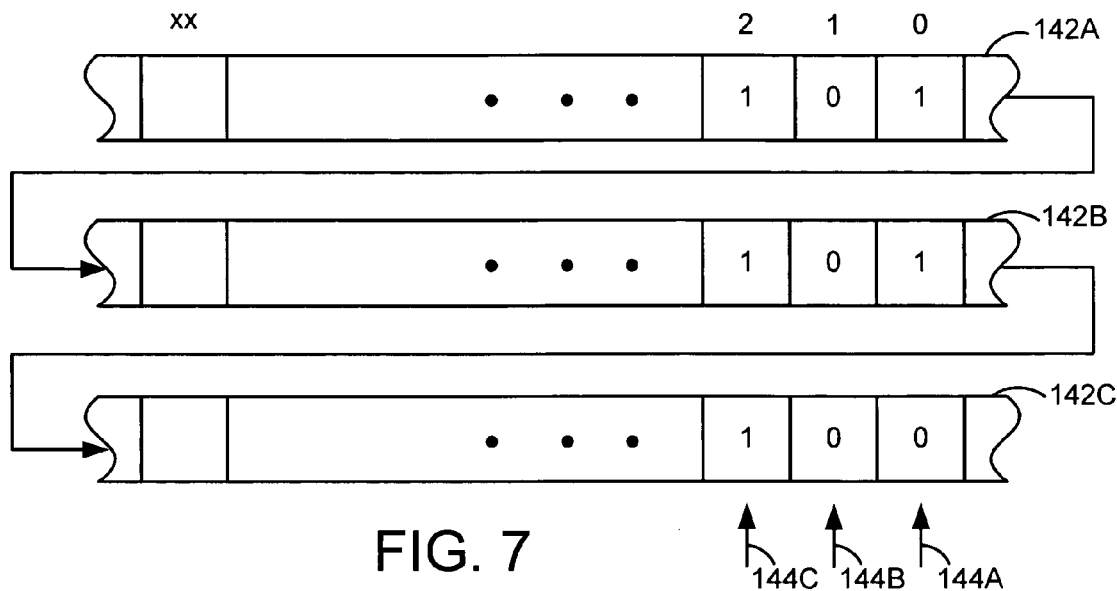
FIG. 7 is a diagrammatical representation similar to FIG. 5 but including three bit fields associated with communicating the unit attention signal to each of three hosts.

FIG. 7 illustrates a modified format of a portion of the target command signal 140 wherein preferably a plurality of bit fields 142A, 142B, 142C are provided for communicating the unit attention signal to each of the plurality of hosts 102A, 102B, 102C. That is, from the illustrative case of FIG. 7 it will be noted that the unit attention signal associated with indicator bit 144A has been communicated to the host 102 that is associated with the bit field 142C (indicator bit 144A value of "0"), but not yet to the other two hosts 102 (indicator bit 144A value of "1"). Accordingly, the next target command signal 140 to the host 102 associated with bit field 142C will send the next-highest priority unit attention signal, or that flagged by indicator bit 144C. However, the next target command signal 140 to the other hosts 102 will send the unit attention signal that is flagged by the indicator bit 144A.

Figure 8:
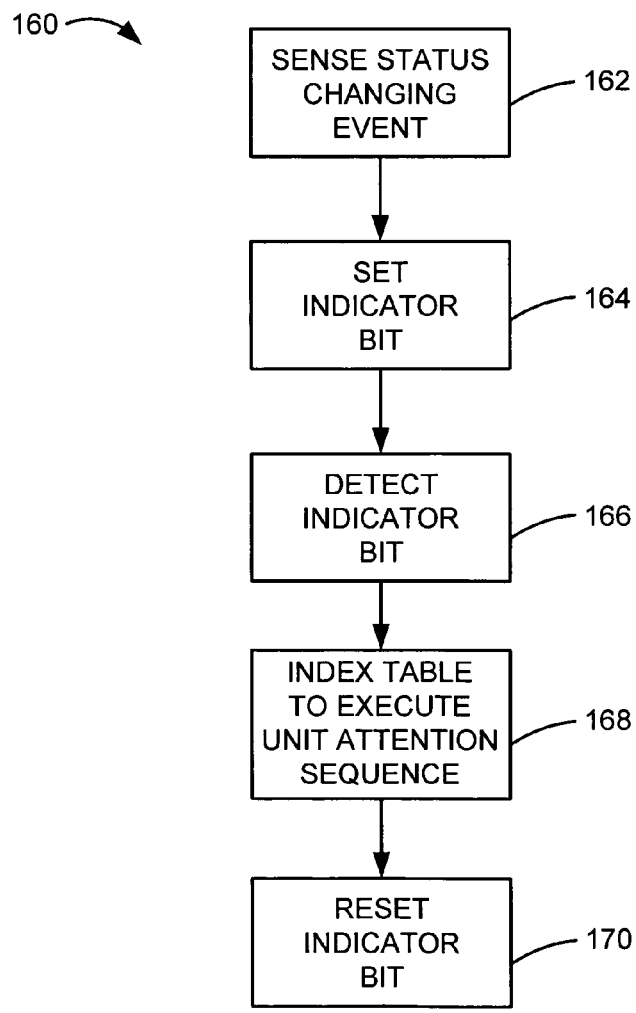
FIG. 8 is a flowchart of a method for MANAGING UNIT ATTENTION SIGNALS in accordance with embodiments of the present invention.

FIG. 8 is a flowchart illustrating steps for practicing a method 160 for MANAGING UNIT ATTENTION SIGNALS in accordance with embodiments of the present invention. The method in block 162 senses a status changing event in the target 122 and sets the respective indicator bits 144 portion of the target command signal 140 to the signaling value in block 164. The embodiments of the present invention generally contemplate the setting an indicator bit step 164 as comprising providing a target command signal 140 format with a bit field 142 that is settable to a signaling value to communicate the appropriateness of one or more unit attention signals. Preferably, the setting an indicator bit step 164 comprises providing the bit field 142 with two or more indicator bits 144 for simultaneously indicating the appropriateness of multiple unit attention signals. Preferably also, the setting an indicator bit step 164 comprises setting an indicator bit 144 in each of a plurality of bit fields 142 in the target command signal 140 associated with a plurality of hosts 102 in the network.

Upon the next command from the host 102 to the target 122, the target 122 returns the target command signal 140 with the embedded bit fields 142. The highest-priority indicator bit 144 having assumed the signaling value is detected in block 166, and the bit position of the indicator bit 144 is used to index the table 146 for addressing the corresponding unit attention sequence in block 168. Preferably, the detecting the indicator bit step 166 comprises prioritizing the indicator bits 144 by position in the bit field 142 for selectively detecting a first indicator bit 144 before detecting a second indicator bit 144.

In block 170, subsequent to executing the unit attention sequence in block 168, the indicator bit 144 is reset, reflecting that the unit attention sequence has been communicated to the host 102.

Generally, the embodiments of the present invention contemplate a system for processing a unit attention signal from a target 122 in a distributed network. The system comprises a target command signal 140, and means for managing two or more unit attention signals embedded within the target command signal 140. The means for managing can be characterized by assigning a signaling value to an indicator bit 144 within the target command signal 140 following a status change in the target 122. The means for managing is distinguishable over solutions that store either the need for or communication of a unit attention signal in a table separate from the target command signal 140. The means for managing can further be characterized by detecting the signaling value and in response indexing a table, such as 146, with unit attention sequences associated with the indicator bit 144. In this manner the means for managing provides a simple and straightforward device and associated method for associating the requisite unit attention sequences with the indicator bits 144 of the target command signal 140. Code space is cut to a minimum by handling the signaling of multiple unit attention signals within the bit field portion 142 of the target command signal 140. Adding new unit attention signals, or changing existing unit attention signals, or even changing priority among existing unit attention signals requires no programming step changes, but rather simply changing the association between the indicator bit 144 priority and the table 146 addressed sequences.

The means for managing can be further characterized by the bit field 142 comprising two or more indicator bits 144 for simultaneously indicating multiple unit attention signals. This is distinguishable over solutions which can only send a unit attention signal if the target 122 currently has no pending unit attention signals intended for hosts 102 other than the one currently sending the host command. The means for managing can be further characterized by indicator bits 144 that are prioritized according to a position within the bit field 142, such that the highest-priority unit attention signal is the next one communicated. The means for managing can be further characterized by resetting the indicator bit 144 subsequent to indexing the table 146 for executing the unit attention sequence, and further characterized by assigning a signaling value to an indicator bit 144 in each of a plurality of bit fields 142 in the target command signal 140 that are associated with a plurality of hosts 102 in the network following a status change event in the target 122. This is distinguishable over solutions that disadvantageously reset stored values reflecting the communication of a pending unit attention signal to a first host when the target is addressed by a second host.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular network structure without departing from the spirit and scope of the present invention.

What is claimed is:

1. A distributed network that processes instructions stored in a computer readable memory to perform signal processing to determine an indicator bit value of a target command signal transmitted by a target device in response to a status changing event, responsively index a table stored in computer readable memory not in the target device according to the indicator bit value, and execute code indexed by the table in order to communicate a unit attention sequence to an initiator that corresponds to the target command signal from the target device, wherein the table references a plurality of different predefined code sets stored in computer readable memory not in the target device and associated with respective unit attention sequences.

2. The distributed network of claim 1 wherein the target command signal comprises a bit field that includes two or more indicator bits that are indexable to different code sets in the table for executing respective unit attention sequences.

3. The distributed network of claim 2 wherein the two or more indicator bits are ordered according to a predefined priority for selectively indexing the table according to a first indicator bit before indexing the table according to a second indicator bit.

4. The distributed network of claim 2 wherein a predefined value of a first indicator bit results in indexing the table according to a value of a second indicator bit.

5. The distributed network of claim 3 wherein the target device resets the highest priory indicator bit before transmitting a subsequent target command signal.

6. The distributed network of claim 2 wherein a first indicator bit results in communicating the indexed unit attention sequence that is associated with the target command signal to a first initiator, and a second indicator bit results in communicating the indexed unit attention sequence that is associated with the target command signal to a different second initiator.

7. The distributed network of claim 3 wherein the target command signal is characterized by prioritizing the indicator bits by position in the bit field.

8. The distributed network of claim 4 wherein the second indicator bit is of a predetermined lower priority than the first indicator bit.

9. The distributed network of claim 2 wherein the bit field is characterized by two or more indicator bits simultaneously indexable to multiple unit attention sequences in the table.

10. A method comprising:
signal processing by a computer to detect an indicator bit value in a target command signal received from a target device in response to a status changing event;
indexing a table stored in computer readable memory not in the target device according to the indicator bit value, the table referencing a plurality of different predefined code sets stored in computer readable memory not in the target device and associated with respective unit attention sequences; and
executing the indexed code by a computer to communicate the unit attention sequence that is associated with the target command signal to an initiator.

11. The method of claim 10 wherein the target command signal is characterized by a bit field that includes a plurality of indicator bits.

12. The method of claim 11 wherein the bit field is characterized by two or more indicator bits simultaneously indexable to multiple unit attention sequences in the table.

13. The method of claim 12 wherein the target command signal is characterized by prioritizing the indicator bits for selectively indexing the table according to a first indicator bit before indexing the table according to a second indicator bit.

14. The method of claim 13 wherein the target command signal is characterized by prioritizing the indicator bits by position in the bit field.

15. The method of claim 13 comprising the target device resetting the highest priority indicator bit before transmitting a subsequent target command signal.

16. The method of claim 11 characterized by a first indicator bit resulting in communicating the unit attention sequence associated with the target command signal to a first initiator and a second indicator bit resulting in communicating the unit attention sequence associated with the target command signal to a different second initiator.

17. The distributed network of claim 11 wherein a predetermined value of a first indicator bit results in indexing the table according to a value of a second indicator bit.

18. The distributed network of claim 17 wherein the second indicator bit is of a predetermined lower priority than the first indicator bit.

* * * * *

UNITED STATES PATENT AND TRADEMARK OFFICE
CERTIFICATE OF CORRECTION

PATENT NO. : 7,590,679 B2  Page 1 of 1
APPLICATION NO. : 10/967585
DATED : September 15, 2009
INVENTOR(S) : McCarty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 808 days.

Signed and Sealed this

Twenty-first Day of September, 2010

David J. Kappos
*Director of the United States Patent and Trademark Office*